(12) United States Patent
Allan et al.

(10) Patent No.: US 8,027,920 B1
(45) Date of Patent: Sep. 27, 2011

(54) VALUE TRANSACTION SYSTEMS

(75) Inventors: Richard Douglas Allan, Berkshire (GB); Bernard Joseph Campbell, Hampshire (GB)

(73) Assignee: MEI, Inc., West Chester, PA (US)

( * ) Notice: Subject to any disclaimer, the term of this patent is extended or adjusted under 35 U.S.C. 154(b) by 3882 days.

(21) Appl. No.: 09/696,099

(22) Filed: Oct. 25, 2000

(30) Foreign Application Priority Data

Nov. 10, 1999 (GB) .................................. 9926659.5

(51) Int. Cl.
*G06Q 40/00* (2006.01)

(52) U.S. Cl. ................. 705/43; 705/35; 705/39; 705/40; 705/44

(58) Field of Classification Search ............. 705/35, 705/37, 14, 16, 21, 39, 41, 43, 44, 64, 65, 705/67, 72, 40; 902/8, 11, 13
See application file for complete search history.

(56) References Cited

U.S. PATENT DOCUMENTS

| | | | |
|---|---|---|---|
| 5,980,090 A | 11/1999 | Royal, Jr. et al. | |
| 6,311,165 B1 * | 10/2001 | Coutts et al. | 705/21 |
| 6,318,536 B1 * | 11/2001 | Korman et al. | 194/217 |
| 6,449,253 B1 * | 9/2002 | Ott | 370/231 |
| 2001/0011680 A1 * | 8/2001 | Soltesz et al. | 235/379 |

FOREIGN PATENT DOCUMENTS

| | | |
|---|---|---|
| DE | 298 17 783 U1 | 6/1999 |
| EP | 0 100 240 A2 | 2/1984 |
| EP | 0 953 946 | 11/1999 |
| GB | 2 209 080 A | 4/1989 |
| JP | 63-010486 | 1/1988 |
| JP | 04-312196 | 11/1992 |
| JP | 10-302121 | 11/1998 |
| JP | 10-320209 | 12/1998 |
| WO | WO 97/50063 | 12/1997 |
| WO | WO 98/19237 | 5/1998 |
| WO | WO 98/24041 | 6/1998 |
| WO | WO 99/50800 | 10/1999 |

OTHER PUBLICATIONS

Spinning a new Web of Online banks David Hallerman. Bank Technology News. New York: Jul. 1999. vol. 12, Iss. 7; p. 1 (4 pages).*
B/N New solutions Anonymous. Bank News. Kansas City: Mar. 1999. vol. 99, Iss. 3; p. 10 (4 pages).*

* cited by examiner

*Primary Examiner* — Lalita M Hamilton
(74) *Attorney, Agent, or Firm* — Fish & Richardson P.C.

(57) ABSTRACT

A transaction system comprises a plurality of transaction units each for performing a respective type of transaction. The units are interconnected via a serial link, and there is a common controller which has respective protected memory areas storing Java code for controlling the respective units.

8 Claims, 1 Drawing Sheet

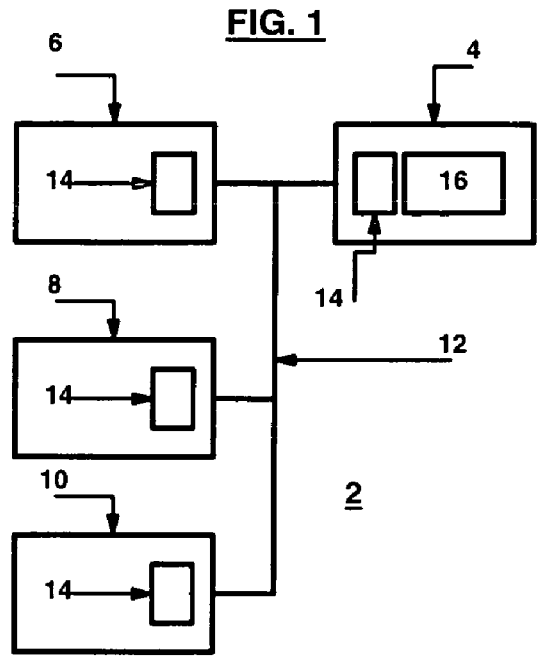
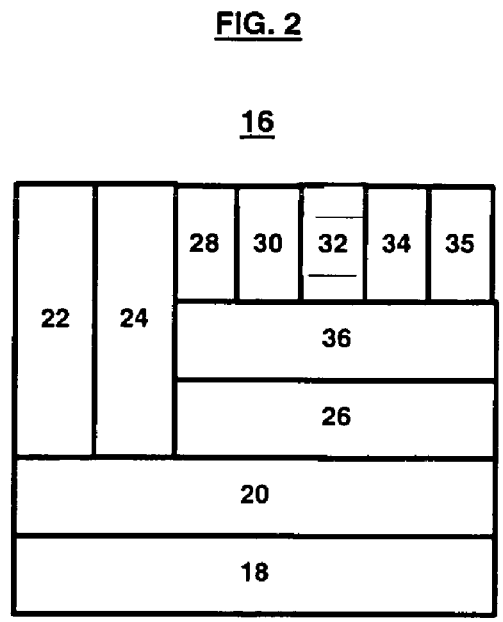
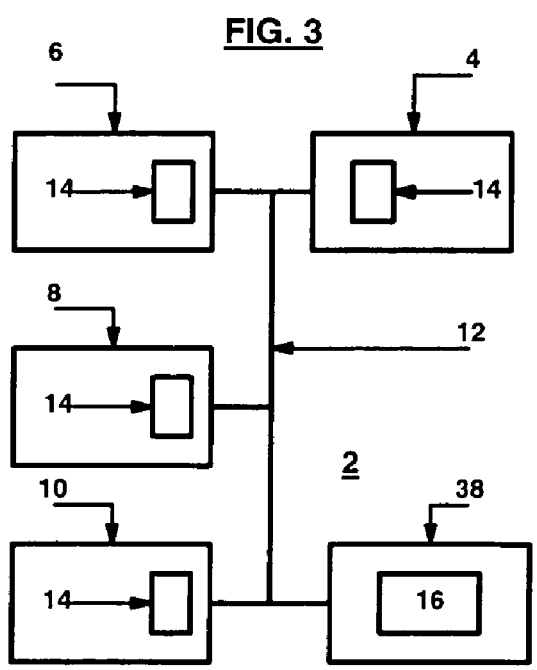

VALUE TRANSACTION SYSTEMS

This invention relates to value transaction systems, and is particularly but not exclusively concerned with transaction-systems for providing products or tickets or the like in exchange for value, preferably in an unattended and/or offline situation. The invention is further concerned with systems comprising interconnected transaction units such as coin mechanisms, banknote mechanisms, card readers, vending machines, etc.

It is well known to interconnect various units in order to form a transaction system, for example, to fit a card reader into a vending machine. To facilitate this, there are various standards which permit interconnection of transaction units. The units must be configured to allow intercommunication using the selected common hardware and software standards. It would be desirable to make this operation easier, and also to introduce more flexibility into the way in which the different units of the transaction system interact. It would also be desirable to reduce the cost of transaction systems, and simplify changes, upgrades and servicing of the system.

Aspects of the invention are set out in the accompanying claims.

In the preferred embodiments described below, a transaction system comprises a plurality of transaction units including one or more of the following: a coin validator, a banknote validator, a card reader, a vending machine. A single controller, which may be housed on one of the transaction units, is capable of controlling all the interconnected units. To achieve this, the controller has an operating system and a memory storing several units of executable code uploaded from the respective transaction units. (In the following, the term "unit" is used to refer not only to a hardware device—that is, a transaction unit—preferably forming a discrete but connected part of the system, but also to a collection of software routines—that is, a code unit—which may, for example, control such a hardware unit.)

A first unit of code handles the low-level operation of the transaction unit in which the code is stored; for example, in a coin or banknote validator it would handle the reading of the sensors and the processing of the outputs thereof to determine coin or banknote validity. This may be native, and preferably compiled, code. A second unit of code is divided into a plurality of sub-units. One of these may be a central transaction control module for authorizing transactions carried out by the transaction units. The others may each be dedicated to controlling higher-level tasks of the respective transaction units.

Preferably, the sub-units store executable code in the form of Java bytecodes, and the controller has a Java Virtual Machine (JVM) which issues instructions to the operating system in response to execution of the Java bytecodes. Preferably the first unit and each of the sub-units of code are in respective protected memory areas.

By using such a system, it is possible for the transaction units to be inexpensive, as they have to handle only low-level tasks, due to the use of a common controller for performing the high-level tasks. Because the high-level tasks are performed in a common control unit, exchange of information between the tasks is rendered simpler, and no longer dependent upon the way in which the units are interconnected. It is therefore possible to use a simple, common hardware and software standard for the interconnection, for example an interconnection complying with the Universal Serial Bus standard.

It is particularly desirable for the controller to have a run-time interpreter, such as a JVM, for executing program code stored in non-volatile semiconductor memory. The interpreter can ensure that no illegal operations are carried out by the code at run-time, and thus enforce security. Accordingly, this encourages the design of systems which allow for third-party supply of software.

There may be numerous functions which are carried out by the individual transaction units under the control of signals from the controller. Also, there may be numerous types of messages sent by the transaction units to the controller. In order to facilitate this, the signals delivered to and from the transaction units preferably comply with a simple protocol, which includes (a) an identifying code or address for identifying the relevant transaction unit, (b) a function code identifying the function or command to be carried out by the transaction unit or the event being reported on by the unit, and optionally (c) a parameter for use by the transaction units in carrying out the command, or for describing a reported event.

Arrangements embodying the invention will now be described by way of example with reference to the accompanying drawings, in which:

FIG. 1 illustrates a transaction system in accordance with the invention;

FIG. 2 shows the configuration of a controller housed within a coin changer of the transaction system of FIG. 1; and FIG. 3 shows a second transaction system in accordance with the invention.

Referring to FIG. 1, a transaction system 2 comprises units 4, 6, 8 and 10, all interconnected by a single bus 12, which in this embodiment is a Universal Serial Bus (USB).

The transaction unit 4 is a coin changer, which includes the necessary components for receiving, validating, storing and dispensing coins. The coin changer 4 has a unit interface 14 for sending and receiving signals along the USB 12. The coin changer 4 preferably includes a plurality of coin stores for storing respective coin denominations for change payout purposes. When a serviceman visits the machine, the levels in each tube can be brought to a respective predetermined float level. The coin changer 4 has a procedure for facilitating this by causing, in a float mode, all inserted coins of a respective denomination to be delivered to an appropriate change store until the float level is reached, after which further coins are rejected. Also, the changer can be controlled so as to dispense coins from a coin store until the float level is reached.

The transaction unit 6 is a banknote validator containing the necessary components for receiving, storing and dispensing banknotes, and also includes a unit interface 14 similar to that of the coin changer 4.

The transaction unit 8 is a card reader also containing an interface 14. The card reader 8 is operable to receive information from and write information to smart cards containing electronic memory circuits and/or processors. The card reader 8 may additionally be able to read and write magnetic cards, or there may be another unit for performing this function.

The transaction unit 10 is a vending machine controller containing an interface 14. This is housed in a vending machine (not shown) and enables the vending of products in response to signals received along the USB 12. The other units 4, 6 and 8 may also be housed in the vending machine.

The coin mechanism unit 4 also houses a system controller 16. The controller is operable to control the operation of each of the units 4, 6, 8 and 10. It could be housed in any of the other units, but it is preferred that it be housed in the coin mechanism unit 4, because although each of the units is optional within a transaction system, a coin mechanism is likely to be required, and because the coin mechanism (and the banknote mechanism 6) perform the most processor-intensive tasks.

Referring to FIG. 2, the system controller 16 is shown schematically. This comprises a processor 18 which includes a read/write memory (not shown) acting as a scratchpad memory. The processor 18, which may be a readily-available standard microprocessor, is coupled to memory means storing code in code units 20, 22, 24, 26, 28, 30, 32, 34, 35 and 36.

The microprocessor 18 performs instructions under the control of a real-time operating system formed by code unit 20. The operating system 20 is a multi-tasking operating system which in this embodiment executes code in the code units 22, 24 and 26.

The code unit 22 performs low-level validation tasks, including taking readings from the sensors (not shown) of the coin mechanism and checking these against acceptance criteria. The code in unit 22 may be legacy code, i.e. code which has been used in prior art validators. For speed and compactness, the code is preferably native, and more preferably compiled, code.

The code unit 24 performs housekeeping tasks, including enabling communication with the interface 14. The code unit 26 is a Java Virtual Machine.

High-level operations of the transaction units 4, 6, 8 and 14 are performed by the Java Virtual Machine 26, under the control of respective code units 28, 30, 32 and 34. A further code unit 35 handles overall transaction control and authorisation. Each of these units 28 to 35 stores executable code in the form of Java bytecodes. To facilitate the writing of this code, and for the sake of efficiency, the controller unit 16 also has a further code unit 36, which implements an Application Programmer Interface (API), and which also consists of Java bytecodes. The code of this unit 36 represents Java classes which can be used by the various-units 28 to 35.

Each of the code units 28, 30, 32, 34 and 35 forms a respective code module which is independently functional without regard to the presence of any other code module. (The transaction code module 35 receives signals from and send signals to the other modules, according to a predetermined protocol; thus, the operations of the module may depend on operations performed by other modules. However, each module can perform its functions without relying on code in any other module.) Each module is in a respective, protected memory area (as are, preferably, the code units 22 and 24). Because of this, and because of aspects of the Java language discussed below, it is not possible for any of the applications within the respective modules to interfere with any of the other applications. The memory areas may be protected in any of a number of different ways. For example, they could be "write-once" memories which cannot be altered after the software has been loaded. Alternatively, they could be hardware protected, so that physical memory addresses are checked by dedicated circuitry to ensure access is provided only to appropriate software (e.g. software in the respective area). Alternatively, the operating system 20 could perform a corresponding task.

Accordingly, such an arrangement is particularly suited for enabling various different manufacturers to produce individual transaction system units and/or the controlling code for such units, using simple and standard hardware and software, without any significant risk of this interfering with the operation of other transaction units even if the system contains transaction units from different manufacturers.

The functions performed by the software modules 28 to 35 may include the following:

Transaction Code Module 35

This would receive credit signals from the coin changer 4, banknote validator 6 and card reader 8, and product selection information (such as a product price) from the vending machine controller 10, preferably via their respective controlling modules. The transaction controller would compare credits with prices, and when appropriate would issue an authorisation signal to the code module 34 for the vending machine controller 10 for permitting a vend. The module would also issue signals to the code modules for the coin changer 4, the banknote validator 6 and card reader 8 indicating that a vend has taken place. This would enable the dispensing of change from the coin changer 4 and/or banknote validator 6 (and for this purpose the transaction controller may provide signals indicating how much change is to be dispensed) under the control of their respective code modules, and/or would instruct the code module for the card reader 8 to write a new credit amount on the card (which would occur before sending the vend authorisation signal to the vend controller 10).

The transaction module 35 would also be arranged to perform audit functions, i.e. to keep a record of transactions carried out by the various transaction units and to make this record available for downloading, for example to a terminal temporarily connected to the transaction system, or remotely via, for example, a telephone line.

Coin Changer Code Module 28

This module receives signals indicative of acceptable coins from the code unit 22. For code portability, the code unit 22 may deliver the signals via the transaction module 35 and/or the interface 14, so the same module 28 can be used in other systems in which it is not held within the coin changer unit 4. The code module 28 also forwards signals representing an amount of credit to the transaction code module 35. The module 28 may also contain an algorithm for calculating the distribution of denominations to be paid out in change, on receipt of the signal from the transaction module indicating how much change should be dispensed. For this purpose, the module may be arranged to receive from the coin changer 4 signals representing how much change is available in the respective denominations stored by the changer.

The module 28 may also be used to determine the above-mentioned "float levels".

The module may also issue signals to the coin changer 4 for selectively inhibiting acceptance of particular denominations.

Banknote Validator Module 30

This may be arranged to perform for the banknote validator the same functions as the module 28 performs for the coin changer 4.

Card Reader Module 32

This module may be arranged to process data received from the card reader in order to determine credit values which are then passed to the transaction module 35. Similarly, any debit instructions issued by the module 35 may be interpreted by the card reader module 32 before being passed on to the card reader itself.

In addition, the module 32 may be arranged to respond to signals from the card reader in order to deduce the type and/or functionality of the card which has been inserted, and then issue appropriate instructions to the card reader. Thus, this enables automatic adaptation so that, for example, the appropriate protocol is used for communicating with the inserted card, or the appropriate operations are carried out depending on whether the card is a debit card or a credit card, etc.

In order to deal with different types of cards, the module 32 may itself comprise sub-modules (as indicated by broken lines), each possibly in its own protected memory area, and each handling a respective application for a respective type of card. The application can be selected in accordance with the detected protocol.

Vending Machine Control Module 34

This would receive product selection signals from the vending machine controller 14, send product price values to the transaction controller module 35, receive therefrom the vend authorisation signal and send a product dispense signal to the controller 10.

The module 34 may also be arranged to send to the vending machine controller 10 signals representing messages to be displayed on a display of the vending machine.

In a preferred embodiment, the units 6, 8 and 10 may each have a respective memory storing the bytecodes for the respective modules 30, 32 and 34. The contents of the memory in each unit are uploaded to the system controller 16 in an initialisation operation for that unit.

In an alternative embodiment, the JVM 26 is replaced by a just-in-time (JIT) compiler.

In a further alternative, the JVM 26, the operating system 20 and the processor 18 are replaced by a Java Physical Machine (JPM), in which case the codes in modules 22 and 24 are also formed by Java bytecodes.

FIG. 3 represents an alternative embodiment of the transaction system 2, in which the system controller 16 is housed in a separate controller unit 38, instead of one of the transaction units 4, 6, 8 and 10.

It is possible to use languages other than Java for the modules 28, 30, 32, 34 and 35. However, whichever language is used, it is preferable that this be an interpreted language so that restrictions can be enforced at run time to ensure integrity.

In particular, it is preferable that the language incorporate restrictions so as to prevent direct access to physical addresses. Thus, it is desirable to ensure that the language does not use pointers explicitly. It is also preferable that the language be such that array accesses are checked to be within bounds at run-time, that only legal type conversions are allowable and that all method calls are checked to ensure that the method is being invoked on the correct type of object.

Also, it is possible for one or more of the individual modules to include, or be formed by, native or compiled code, although this would obviate some of the advantages mentioned above. For example, the module 28 could be omitted, and the functions performed instead by the code in unit 27.

It is also desirable for there to be an authentication procedure, such that the software of each module is run only if the JVM determines, according to a predetermined set of conditions, that the software is authentic. For example, the software could contain an authentication code which has to be deemed by the interpreter to be appropriate before the software is run.

It may also be possible to have a conventional transaction unit, with its own controlling software, coupled to a system according to the invention.

Java is a trademark of Sun Microsystems, Inc.

The invention claimed is:

1. A validation transaction unit for a value transaction system, the validation transaction unit comprising validator components enabling validation of a currency item and a microprocessor system including:
   (a) a validation code unit operable to accept and process input signals from said validator components for the purposes of validation of said item of currency;
   (b) a Java Virtual Machine; and
   (c) at least one Java application operable to perform controlling functions for a respective further transaction unit to which the validation transaction unit is connected,
   wherein the microprocessor system is operable to upload the Java application from the further transaction unit.

2. A validation transaction unit as claimed in claim 1, wherein the validation code unit comprises native code.

3. A validation transaction unit as claimed in claim 1, wherein the validation code unit comprises compiled code.

4. A validation transaction unit as claimed in claim 1, including a further Java application operable to perform controlling functions for the validation transaction unit.

5. A validation transaction unit as claimed in claim 1, wherein the validation transaction unit is a coin validation mechanism.

6. A transaction system comprising a validation transaction unit as claimed in claim 1, and at least one further transaction unit under the control of the microprocessor system in said validation transaction unit.

7. A transaction system as claimed in claim 6, wherein the transaction units are interconnected via a serial link.

8. A method of assembling a transaction system, the transaction system comprising a plurality of transaction units and a controller having a processor and memory means for storing executable code in respective code modules each associated with a respective one of the transaction units, the controller being coupled to the transaction units and arranged to receive and send signals from and to the transaction units, and the controller being operable to execute the code in each respective code module, each code module performing processing operations in response to signals received from the respective transaction unit indicative of respective operations performed by that transaction unit, and the code module being further operable to cause the controller to generate controlling signals for sending to the respective transaction unit and capable of representing different functions to be performed by the transaction unit; the method comprising:
   separately loading the executable code for the respective code modules from the associated transaction unit into the memory means of the controller.

* * * * *